United States Patent
Castagna et al.

(10) Patent No.: US 11,079,321 B2
(45) Date of Patent: Aug. 3, 2021

(54) NDIR DETECTOR DEVICE FOR DETECTING GASES HAVING AN INFRARED ABSORPTION SPECTRUM

(71) Applicant: STMICROELECTRONICS S.R.L., Agrate Brianza (IT)

(72) Inventors: Maria Eloisa Castagna, Catania (IT); Salvatore Cascino, Gravina di Catania (IT); Viviana Cerantonio, Acireale (IT); Antonello Santangelo, Belpasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 16/584,808

(22) Filed: Sep. 26, 2019

(65) Prior Publication Data

US 2020/0103339 A1 Apr. 2, 2020

(30) Foreign Application Priority Data

Sep. 28, 2018 (IT) .......................... 102018000009037

(51) Int. Cl.
*G01N 21/3504* (2014.01)

(52) U.S. Cl.
CPC ................ *G01N 21/3504* (2013.01)

(58) Field of Classification Search
CPC .... G01N 21/3504; G01N 15/06; G01N 21/15; G01N 21/17; G01N 21/0303
USPC ........... 356/437, 440; 250/343, 338.1, 339.1, 250/338.3
See application file for complete search history.

(56) References Cited

U.S. PATENT DOCUMENTS

| 4,422,761 A | 12/1983 | Frommer |
| 5,170,064 A | 12/1992 | Howe |
| 5,451,931 A | 9/1995 | Müller et al. |
| 5,973,326 A | 10/1999 | Parry et al. |

(Continued)

FOREIGN PATENT DOCUMENTS

| CN | 109960024 A | 7/2019 |
| JP | 9-229858 A | 9/1997 |
| KR | 101895236 B1 | 9/2018 |

OTHER PUBLICATIONS

Lee et al., "A monolithically integrated plasmonic infrared quantum dot camera," *Nature Communications* 2(286): 2011, 6 pages.

(Continued)

*Primary Examiner* — Isiaka O Akanbi
(74) *Attorney, Agent, or Firm* — Seed IP Law Group LLP

(57) ABSTRACT

The device is formed in a casing including a support, a spacer body, and a mirror element fixed together. A light-emitting element and a light-receiving element are arranged on a bearing surface of the support and face a reflecting surface of the mirror element. The light-emitting element is configured to generate infrared radiation, and the light-receiving element is configured to receive light radiation reflected by the reflecting surface. The spacer body has an emission opening housing the light-emitting element and a reception opening housing the light-receiving element; the reception opening comprises a radiation-limitation portion configured to enable entry of reflected light radiation having an angle, with respect to a normal to the bearing surface, of less than a preset value.

23 Claims, 5 Drawing Sheets

(56) References Cited

U.S. PATENT DOCUMENTS

| | | | |
|---|---|---|---|
| 6,067,840 A * | 5/2000 | Chelvayohan | G01N 21/3504 73/23.2 |
| 7,449,694 B2 * | 11/2008 | Yi | G01N 21/031 250/339.13 |
| 7,796,265 B2 * | 9/2010 | Tkachuk | G01N 21/3504 356/437 |
| 7,880,886 B2 | 2/2011 | Ludwig | |
| 8,003,945 B1 * | 8/2011 | Wong | G01J 5/08 250/343 |
| 8,158,946 B2 * | 4/2012 | Wong | G01J 5/0818 250/343 |
| 8,415,626 B1 * | 4/2013 | Wong | G01J 5/045 250/343 |
| 9,134,224 B2 * | 9/2015 | Matsushima | G01N 21/3504 |
| 9,239,291 B2 | 1/2016 | Sakamoto | |
| 9,804,084 B2 * | 10/2017 | Kouznetsov | G01N 21/3504 |
| 2005/0017206 A1 * | 1/2005 | Tice | G01N 15/06 250/573 |
| 2007/0114421 A1 | 5/2007 | Maehlich et al. | |
| 2009/0235720 A1 | 9/2009 | Smith | |
| 2010/0309013 A1 | 12/2010 | Liess et al. | |
| 2015/0377775 A1 | 12/2015 | Sakai et al. | |
| 2016/0231244 A1 | 8/2016 | Camargo et al. | |
| 2017/0184447 A1 | 6/2017 | Matsunami et al. | |
| 2018/0348121 A1 | 12/2018 | Deliwala | |
| 2019/0195778 A1 | 6/2019 | Lee et al. | |
| 2020/0103334 A1 | 4/2020 | Santangelo et al. | |

OTHER PUBLICATIONS

Chen, "A CMOS Image Sensor Integrated with Plasmonic Colour Filters," *Plasmonics* 7:695-699, 2012.

Källhammer et al., "Fulfilling the pedestrian protection directive using a long-wavelength infrared camera designed to meet both performance and cost targets," *Proc. Of SPIE (6198)*: 2006, 11 pages.

OMRON Corporation, "OMRON Develops the World's First* 16x16 Element MEMS Non-Contact Thermal Sensor for Use in Human Presence Sensors Utilizing Wafer-Level Vacuum Packaging Technology," press release, published online on May 29, 2013, downloaded from https://www.omron.com/media/press/2013/05/e0529.html, 3 pages.

Rogalski, *Infrared Detectors*, Second Edition, 2011, CRC Press, Boca Raton, Florida, front matter and table of contents, 24 pages.

Frodl et al., "A High-Precision NDIR $CO_2$ Gas Sensor for Automotive Applications," *IEEE Sensors Journal* 6(6):1697-1705, 2006.

Han et al., "High Detection Performance of NDIR CO2 Sensor Using Stair-Tapered Reflector," *IEEE Sensors Journal* 13(8):3090-3097, 2013.

Mayrwöger et al., "Modeling of Infrared Gas Sensors Using a Ray Tracing Approach," *IEEE Sensors Journal* 10(11):1691-1698, 2010.

CO2Meter.com, "COZIR™ Ultra Low Power Carbon Dioxide Sensor," product data sheet, 2016, 3 pages.

SenseAir, "Senseair K30 Sensor and OEM Platform," product specification, 2019, 8 pages.

SenseAir, "Senseair S8 5% Miniature infrared $CO_2$ sensor," product specification, 2019, 8 pages.

Figaro Engineering Inc., "Non-Dispersive Infra-Red (NDIR) $CO_2$ Sensor," downloaded from https://www.figaro.co.jp/en/product/feature/cdm7160.html on Sep. 5, 2019, 6 pages.

Allen, "De-construction of the Shinyei PPD42NS dust sensor," version 0.2, EME systems, 2013, 4 pages.

Coating Suisse, "IR-Reject coating Solution for film (Thermal and UV curing), " product data sheet, downloaded from https://www.coating-suisse.com/wp-content/uploads/2016/02/CS-IR-CUT_-Coating-agent-solution-001CS.pdf on Sep. 27, 2019, 16 pages.

Epolin, Inc., "NIR Absorbing Coatings," product data sheet, downloaded from https://www.epolin.com/nir-absorbing-coatings on Sep. 27, 2019, 2 pages.

Fujifilm, "Infrared Absorber Range," product data sheet, downloaded from www.fujifilmusa.com/shared/bin/IGN330_FUJIFILM_INFRARED_ABS_US%2OLETTER_LEA Flet Aw.pdf on Sep. 27, 2019, 2 pages.

Jung (ed.), Op Amp Applications Handbook, Newnes, Burlington Massachusetts, 2005, 103 pages.

Kuula et al., "Response Characterization of an Inexpensive Aerosol Sensor," Sensors 17: 2017, 14 pages.

Lewotsky, "Integrated microlenses reshape VCSEL beams," published online Jul. 1, 1995, downloaded from https://www.laserfocusworld.com/lasers-sources/article/16553585/integrated-microlenses-reshapevcsel-beams on Sep. 30, 2019, 6 pages.

Shao et al., "Fine Particle Sensor Based on Multi-Angle Light Scattering and Data Fusion," Sensors 17:2017, 15 pages.

Sharp, "Application note of Sharp dust sensor GP2Y1010AU0F," GP2Y1010AU0F, Sheet No. OP13024EN, 7 pages.

Spring et al., "Introduction to Mirrors," downloaded from https://www.olympus-lifescience.com/en/microscope-resource/primer/lightandcolor/mirrorsintro/ on Sep. 27, 2019, 8 pages.

Texas Instruments, "TI Designs PM2.5/PM10 Particle Sensor Analog Front-End for Air Quality Monitoring Design," Technical Data Sheet, Dec. 2015, Revised May 2016, 44 pages.

Tribastone et al., "An Introduction to the Design, Manufacture and Application of Plastic Optics," downloaded from http://www.apollooptical.com/content/docs/photonics_article.pdf on Sep. 27, 2019, 10 pages.

United States Environmental Protection Agency, "AQI Breakpoints," published online on Sep. 27, 2019, downloaded from https://aqs.epa.gov/aqsweb/documents/codetables/aqi_breakpoints.html on Sep. 27, 2019, 6 pages.

Wang et al., "Laboratory Evaluation and Calibration of Three Low-Cost Particle Sensors for Particulate Matter Measurement," Aerosol Science and Technology 49:1063-1077, 2015.

* cited by examiner

NDIR DETECTOR DEVICE FOR DETECTING GASES HAVING AN INFRARED ABSORPTION SPECTRUM

BACKGROUND

Technical Field

The present disclosure relates to a non-dispersive infrared (NDIR) detector device for detecting gases having an infrared absorption spectrum. In particular, the present detector is suited for detecting gases with absorption in the wavelength range 3 to 8 µm.

Description of the Related Art

As is known, NDIR detectors are non-dispersive sensors, where the light emitted by a light source is not broken down into its spectral components, but is selected by an appropriate filter. In practice, in these sensors, a gas to be analyzed absorbs the infrared radiation generated by the source in a preset frequency range, and a suitable photodetector measures the absorption.

NDIR detectors of the above type have multiple applications above all in the detection of environmental gases and may be used for detecting the presence of gases such as $CO_2$, CO, ethanol, hydrocarbons, etc. They are thus used in industrial, medical, foodstuff (from crop growing, to animal breeding, to packaging and conservation), automotive, and smart-building applications. In the latter case, a detector device may be mounted in air-conditioning systems, thus enabling regulation of the operation thereof as a function of the environmental parameters. In particular, the detector device can measure the concentration of $CO_2$ and activate the conditioning system upon exceeding a threshold value, and deactivate it upon dropping below the same or another threshold.

FIG. 1 shows a simplified diagram of a known NDIR detector of the considered type, for example for detecting $CO_2$. Here, a light source 1 emits a light radiation, referred to as "emitted light radiation 2", towards a first mirror structure 3. The radiation is then reflected by the latter as reflected light radiation 4 towards a second mirror structure 5. The second mirror structure 5 focuses the reflected light radiation 4 towards a filter 9 and a detector 10 operating in the infrared (concentrated light radiation 11). The filter 9 (for example, an interferential filter or a plasmonic filter) is configured to pass only the component of the concentrated light radiation 11 corresponding to the absorption wavelength of the gas to be detected (here $CO_2$).

In presence of $CO_2$ molecules in the space between the first and second mirror structures 3, 5, they absorb the reflected light radiation 4 in the wavelength range centered on approximately 4.25 µm, and the detector 10 can measure the light intensity of the concentrated light radiation 11 in this frequency range. The lower the light intensity detected (and thus the electrical signal generated by the detector 10), the higher the concentration of $CO_2$ present. An electronic circuit connected to the detector 10 may then output signals and controls related to the concentration.

Various infrared NDIR gas-detector devices operating according to the above principle have been proposed, but have problems of high cost, low sensitivity, and complex mounting. Frequently, they use light sources and/or detectors manufactured with technologies having a relatively high cost and use additional components, such as particular lenses and filters, which increase the manufacturing costs and/or entail complex and costly mounting procedures.

For instance, a known infrared gas detector uses a complex waveguide to obtain a series of reflections of the emitted light radiation so as to increase the optical path and detection sensitivity. The increase of the optical path length, however, causes absorption losses due to numerous reflections. Moreover, the known detector has high costs due to the use of semiconductor components of Groups III-V.

Other solutions use White's cells and are again based upon multiple reflections of the light radiation emitted within an optical chamber. Also these systems are, however, costly and entail a complex mounting for arranging many parts in a precise way.

Other simpler systems have a linear optical path, without reflections. They, however, still have high costs, a complex mounting, and low sensitivity.

BRIEF SUMMARY

An aim of the present disclosure is to provide an infrared gas detector overcoming the drawbacks of the prior art and in particular having high sensitivity and low manufacturing costs.

According to the present disclosure, an NDIR detector device for detecting molecules in a gas is provided.

BRIEF DESCRIPTION OF THE SEVERAL VIEWS OF THE DRAWINGS

For a better understanding of the present disclosure, an embodiment thereof is now described, purely by way of non-limiting example, with reference to the attached drawings, wherein.

DETAILED DESCRIPTION

Figure 1:
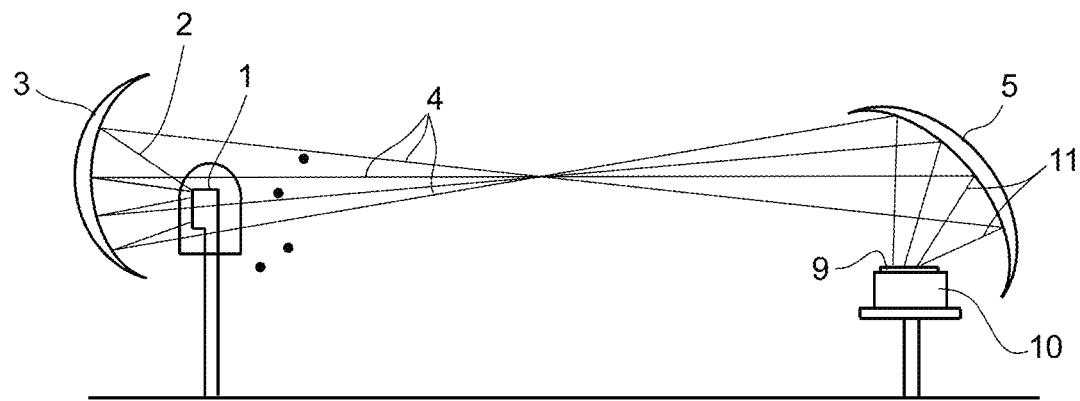
FIG. 1 shows a principle diagram of an NDIR infrared gas detector.
Figure 2:
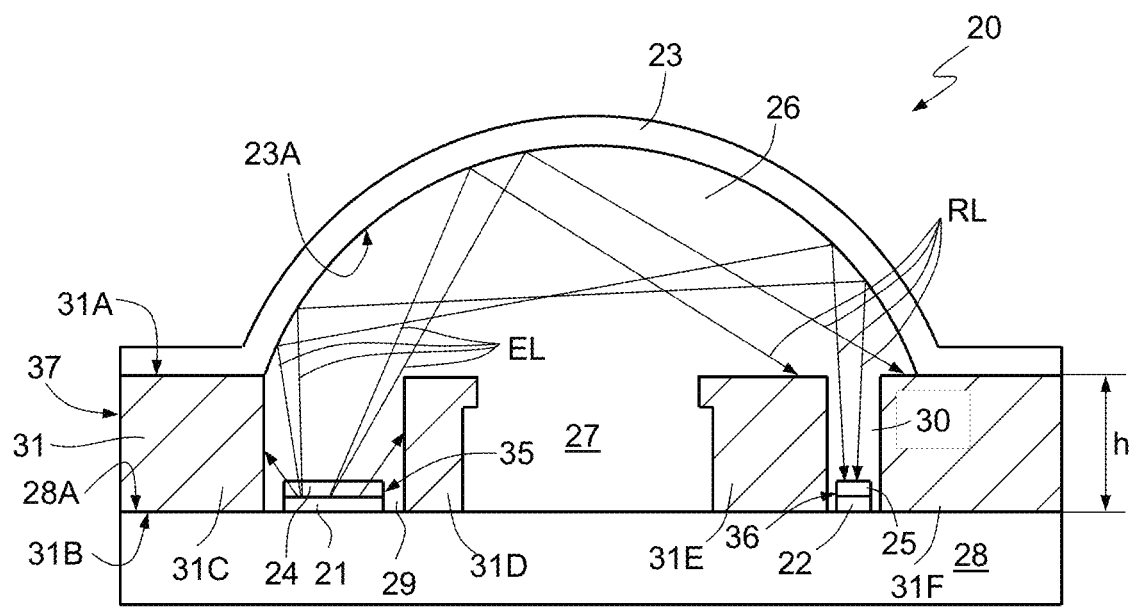
FIG. 2 shows a principle diagram of the present detector device.

FIG. 2 shows the simplified structure of a detector device 20.

The detector device 20 comprises a support 28, a spacer body 31, and a mirror 23, fixed together and forming a casing 37 housing a light-emitting element 35 and a light-receiving element 36. The mirror 23 faces the light-emitting element 35 and the light-receiving element 36 and delimits, with the spacer body 31, a reflection chamber 26.

The light-emitting element 35 comprises a light source 21 and an emission filter 24. The light-receiving element 36 comprises a photodetector 22 and a reception filter 25.

The light-emitting element 35 and the light-receiving element 36 are fixed on a bearing surface 28A of the support 28. The light-emitting element 35 is housed in an emission opening 29 of the spacer body 31, and the light-receiving element 36 is housed in a reception opening 30 of the spacer body 31. The emission filter 24 is arranged between the light source 21 and the mirror 23, and the reception filter 25 is arranged between the photodetector 22 and the mirror 23.

The spacer body 31 has a top surface 31A and a bottom surface 31B and is fixed to the support 28 at its bottom surface 31B and to the mirror 23 at its top surface 31A. The spacer body 31 also includes wall portions 31C, 31D defining opposite sides of the emission opening 29 and wall portions 31E, 31F defining opposite sides of the reception opening 30. The wall portions 31C, 31D may be portions of a single wall that laterally defines a perimeter of the emission opening 29 or may be respective walls of a set of walls that laterally define the perimeter of the emission opening 29. Similarly, the wall portions 31E, 31F may be portions of a single wall that laterally defines a perimeter of the reception opening 30 or may be respective walls of a set of walls that laterally define the perimeter of the reception opening 30.

A gas-inlet channel 27 extends through the casing 37, in particular here through the spacer body 31, and is connected to the reflection chamber 26 to allow a gas to be analyzed to get in, as described more in detail hereinafter with reference to FIG. 5.

The light source 21 may be a low-cost infrared source, for example formed by a semiconductor die (as described in detail hereinafter with reference to FIG. 7). The photodetector 22 is, for example, formed by a thermopile, a pyrometer, or a bolometer (as described in detail hereinafter with reference to FIG. 5).

The emission filter 24 is configured to filter and/or concentrate the radiation emitted by the light source 21. It may comprise, for example, a sapphire filter or a lens.

The reception filter 25 is, e.g., a plasmonic filter or an interferential filter and ideally passes only the typical absorption wavelengths of the gas to be detected.

In FIG. 2, the emission filter 24 and the reception filter 25 are arranged above the light source 21 and the photodetector 22, respectively, but may be integrated therein or carried by the spacer body 31, as discussed hereinafter.

Figure 3:
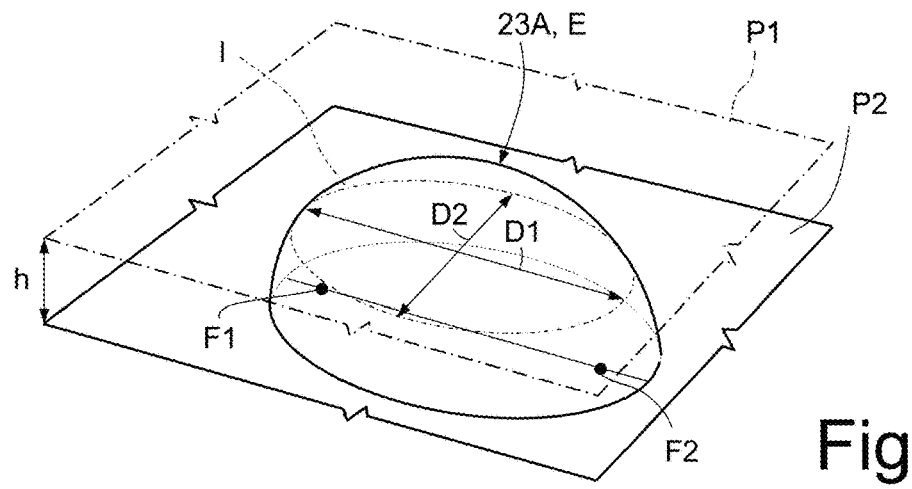
FIG. 3 is a perspective view of the geometrical structure of a part of the detector device of FIG. 2.

The mirror 23 has a reflecting surface 23A, with a curved shape. In particular, with reference also to FIG. 3, the reflecting surface 23A has the shape of a surface portion of an ellipsoid E obtained by cutting the ellipsoid E with a cutting plane P1 parallel to a meridian plane P2 in which the foci F1, F2 of the ellipsoid E lie. In this way, the reflecting surface 23A is delimited below by an ellipse I lying in the cutting plane P1 and having a major axis D1 and a minor axis D2.

In the detector device 20, the planes P1 and P2 are arranged at a distance h, and the spacer body 31 has a height equal to the distance h; the light source 21 and the photodetector 22 are arranged mutually aligned at the foci F1, F2 of the ellipsoid E, in particular (considering their non-punctiform dimensions) so that their areas are approximately centered on the foci F1, F2.

By virtue of the above geometry, as illustrated in FIG. 2, the light radiation emitted by the light-emitting element 35 and exiting from the emission opening 29, hereinafter referred to as emitted light radiation EL, is reflected one or more times by the reflecting surface 23A towards the light-receiving element 36 as reflected light radiation RL.

The openings 29 and 30 are sized to select the angle of the light radiation received by the light-receiving element 36. In fact, proper operation of the detector device 20 depends upon the incidence angle of the reflected light radiation RL received by the light-receiving element 36, as discussed below.

In particular, the emission opening 29 is sized such that the wall portions 31C, 31D absorb the part of the light radiation emitted by the light-emitting element 35 that has a wide angle with respect to the vertical of the device (normal to the bearing surface 28A of the support 28) and allow only the part of the emitted light radiation having a narrow angle to exit from the transmission opening 29. To this end, the inner surfaces of the wall portions 31C, 31D defining the transmission opening 29 may be blackened and absorb the radiation part emitted by the light source that has a wide angle with respect to the vertical (perpendicular to the bearing surface 28A of the support and to the surfaces 31A and 31B of the spacer body 31). For instance, the inner surface of the wall portions 31C, 31D defining the transmission opening 29 may be coated, in particular painted, with a light-absorbing material or be treated so as to have high absorption, for example higher than 90-95%.

Likewise, the reception opening 30 is sized to allow only part of the reflected light radiation to reach the light-receiving element 36.

Figure 4A:
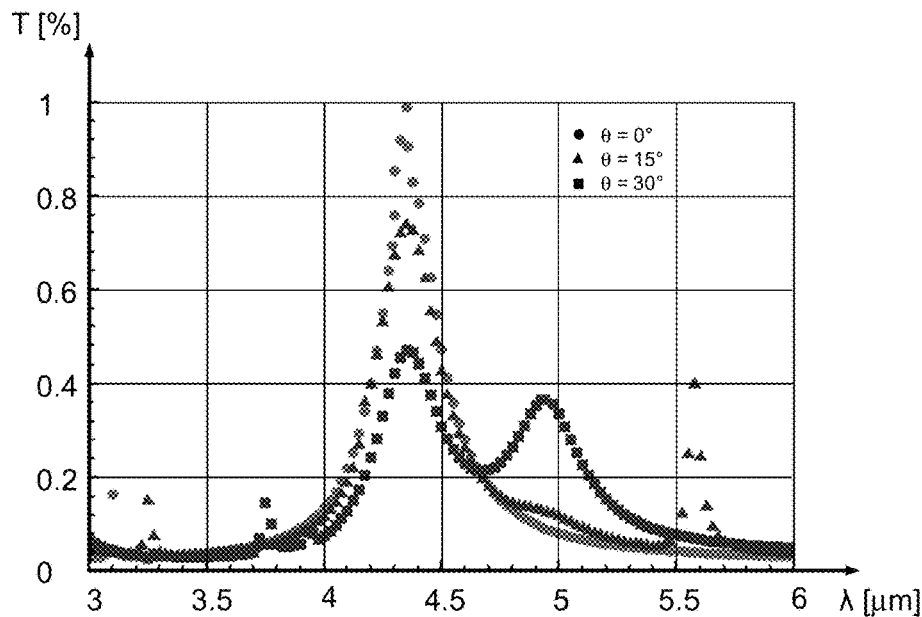
FIGS. 4A and 4B show spectra of components of the present detector device.

In fact, as shown in FIG. 4A for a plasmonic reception filter 25, the absorption curves have a pattern depending upon the angle of incidence. In particular, as the angle of incidence increases, the transmission peak decreases and the curves have various peaks, also at frequencies different from the one to be detected (in the considered example, at the $CO_2$ absorption frequency). Consequently, with an increasing angle of incidence of the reflected light radiation RL, the reception filter 25 would pass also light radiation reflected at different frequency from the one to be detected.

Figure 4B:
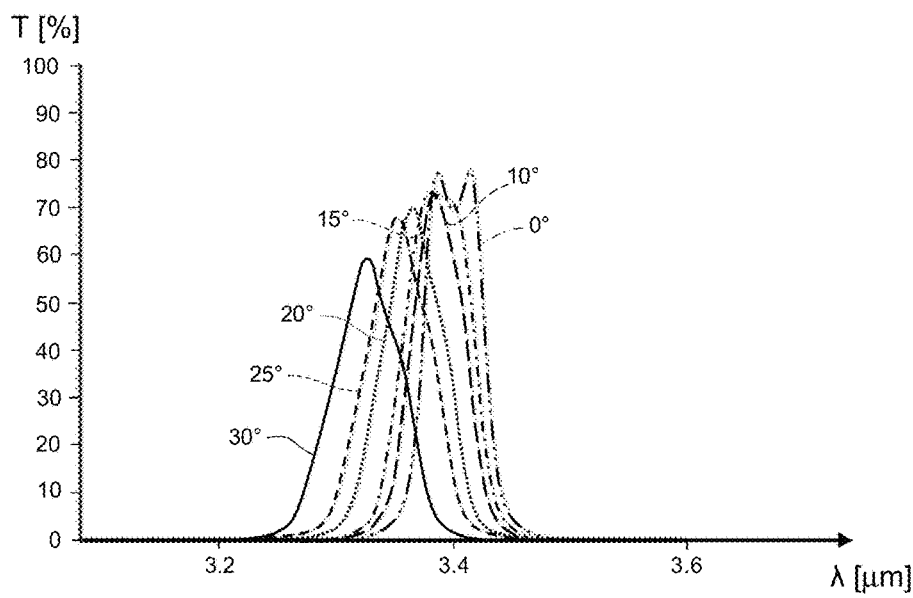

The same problem exists when the reception filter 25 is of an interferential type and has the transmission curves illustrated in FIG. 4B.

For proper detection by the photodetector 22, the reception opening 30 prevents the reflected light radiation RL that has an angle wider than a preset value from reaching the photodetector 22.

In particular, the reception opening 30 may be sized to pass only the reflected light radiation having an angle of less than 20°.

One embodiment of the detector device 20 is illustrated in FIGS. 5-7D, where the detector device is designated by 60.

In detail (FIGS. 7A and 7B), the mirror 23 may be formed by a molded plastic piece having a suitable surface roughness, of at least one order of magnitude smaller than the wavelength of the signal to be detected. In the embodiment illustrated, the mirror 23 comprises a dome portion 40 and a fixing portion 41. The dome portion 40 internally forms the reflecting surface 23A and is thus shaped like the ellipsoid portion discussed above. In particular, the dome portion 40 may be coated inside with reflecting material such as gold or aluminum to have high reflectivity. The dome portion 40 has a bottom edge, designated by I in FIG. 6 since it coincides with the ellipse I of FIG. 3. The fixing portion 41 extends from the edge I of the reflecting surface of the dome portion 40, has a rectangular perimeter in plan view and has first alignment and fixing holes 42 at the corners.

The spacer body 31, for example, of molded plastic, has a substantially parallelepipedal shape, with width and length equal to the fixing portion 41 of the mirror 23.

Figure 5:
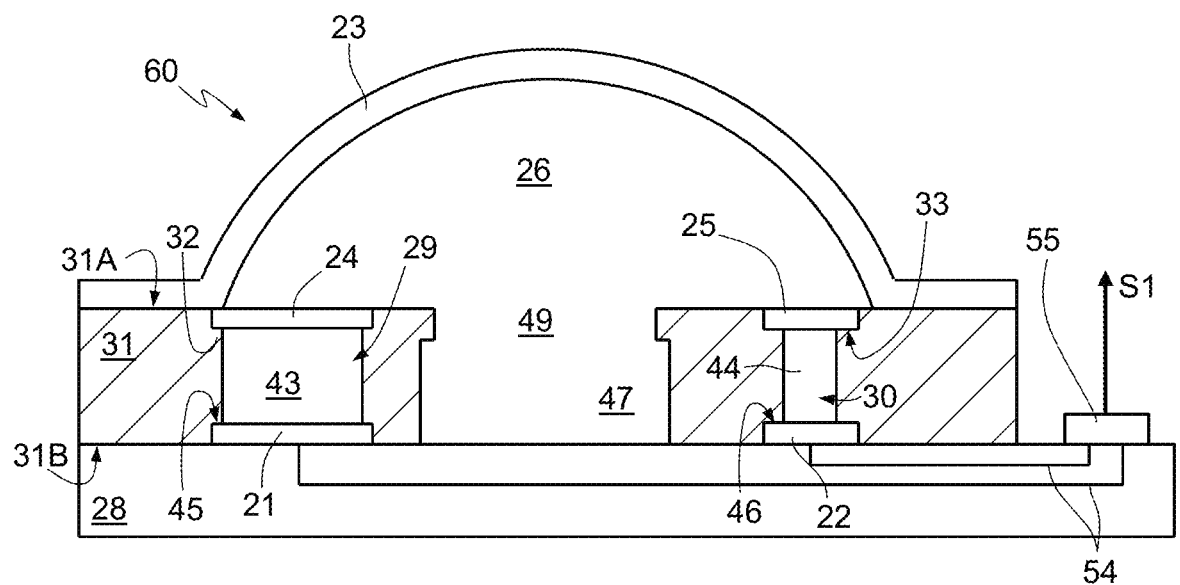
FIG. 5 shows a cross-section of an embodiment of the detector device of FIG. 2.

In the embodiment of FIG. 5, the emission opening 29 comprises an emission hole 43, an emission-filter cavity 32 and a source cavity 45. Moreover, the reception opening 30 comprises a reception hole 44, a reception-filter cavity 33 and a photodetector cavity 46.

In particular, in the illustrated embodiment, the emission hole 43 and the reception hole 44 are through holes and have a cylindrical shape.

Figure 7A:
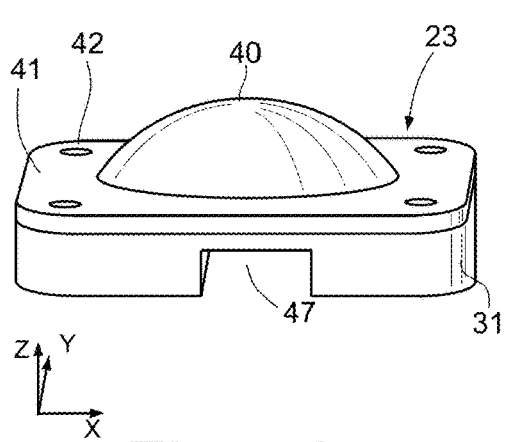
FIGS. 7A-7D are perspective views of parts of the detector device of FIG. 5.
Figure 7B:
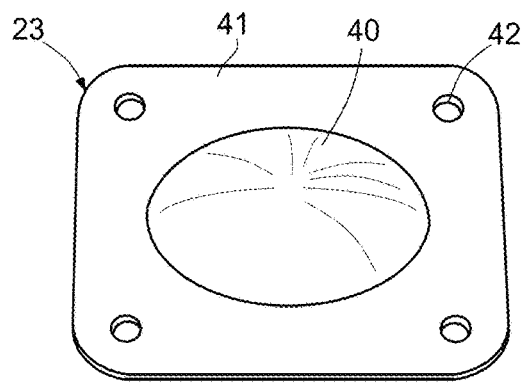
Figure 7C:
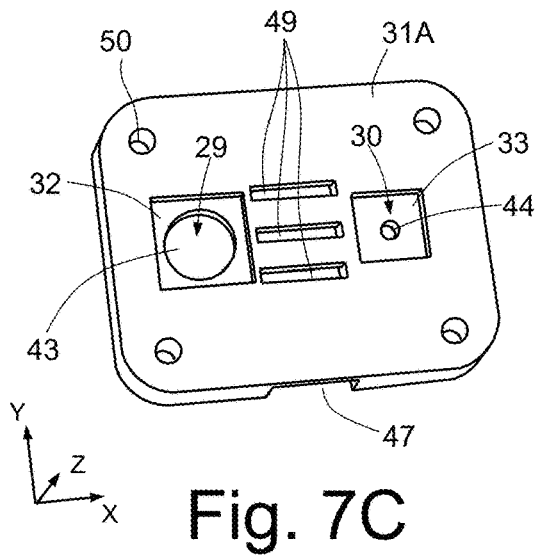

As may be seen in particular in FIG. 7C, the emission-filter cavity 32 and the reception-filter cavity 33 extend from the top surface 31A of the spacer body 31. The emission-filter cavity 32, for example of a quadrangular shape, is aligned and concentric to the emission hole 43 and houses the emission filter 24 (FIG. 5). The reception-filter cavity 33, for example of a quadrangular shape, is aligned and concentric to the reception hole 44 and houses the reception filter 25.

Figure 7D:
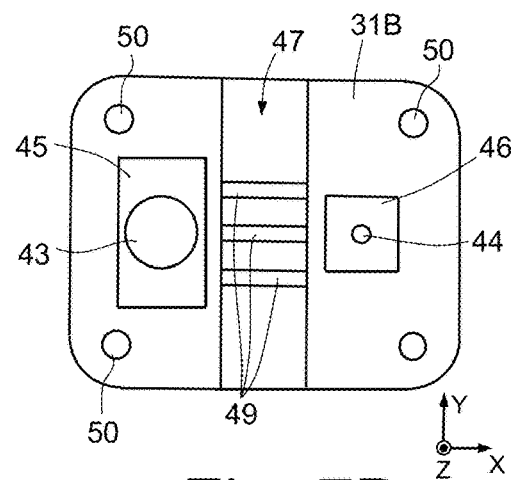

Moreover, as may be seen in particular in FIG. 7D, the source cavity 45 and the photodetector cavity 46 extend from the bottom surface 31B of the spacer body 31. The source cavity 45, for example of a quadrangular shape, is aligned and concentric to the emission hole 43 and to the emission-filter cavity 32, and houses the light source 21. The photodetector cavity 46, for example of a quadrangular shape, is aligned and concentric to the reception hole 44 and to the reception-filter cavity 33, and houses the photodetector 22.

Figure 6:
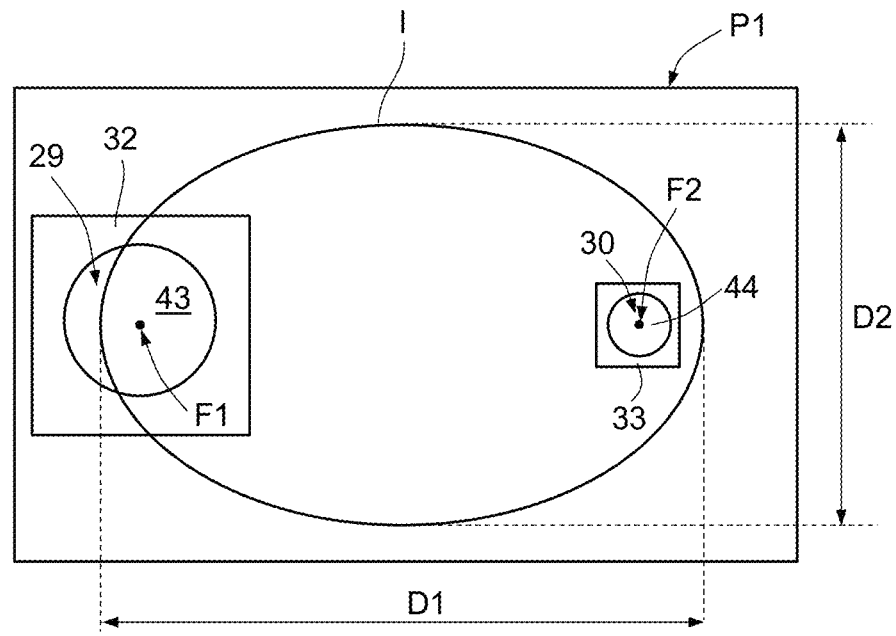
FIG. 6 shows, in top plan view, the mutual position of parts of the detector device of FIG. 5.

Moreover, as may be seen in particular in the view of FIG. 6, the emission hole 43 is arranged to intersect the edge I of the dome portion 40. Thereby, part of the light radiation emitted with a wide angle with respect to the vertical that is not absorbed by the wall of the emission hole 43 is blocked by the fixing portion 41. Instead, the reception hole 44, of smaller size than the emission hole 43, is completely contained within the edge I of the dome portion 40, since the dimensions of the emission hole 43 are sufficient to limit entry of reflected light radiation RL having a wide angle.

The spacer body 31 moreover has a groove 47 (see, in particular, FIGS. 7A and 7D), extending along the bottom side 31B of the spacer body 31 between two opposite walls thereof, parallel to the minor axis D2 of the ellipse I (FIG. 6), intermediate between the openings 29, 30. Slits 49 extend from the top surface 31A of the spacer body 31 through the spacer body 31 up to the groove 47. In the shown example, the slits 49 are three, have an elongated shape transverse to the direction of the groove 47 (and thus parallel to the major diagonal D1 of the ellipse I, FIG. 6), but their number, shape, and dimensions may vary. In practice, the groove 47 and the slits 49 form the gas channel 27 of FIG. 2.

The slits 49 connect the groove 47 to the chamber 26 and, together with the latter, allow a gas to be analyzed to enter the chamber 26. The walls of the groove 47 and of the slits 49 may have a light absorbing structure to prevent external light from penetrating into the chamber 26. For instance, these walls may be coated with absorbent material or have light-absorbing structures, as described above for the inlet opening 29.

Second alignment and fixing holes 50 are arranged at the corners of the spacer body 31 and are aligned with the first alignment and fixing holes 42 to enable mutual fixing through screws or non-threaded pins (not illustrated), for example carried by the support 28. In this way, the various parts of the detector device 60 can be automatically and correctly aligned in the mounting stage.

As shown in FIG. 5, the detector device 60 further comprises a control and processing unit 55. The control and processing unit 55, for example an ASIC (Application-Specific Integrated Circuit), is carried by the support 28, alongside the spacer body 31, but could be arranged in the groove 47 or within a suitable cavity, in a way not shown.

The support 28 may be of plastic material and the detector device 60 may include conductive regions forming electrical-connection lines 54 that extend within the support 28, in a known way, and electrically connect the light source 21, the photodetector 22, and the control and processing unit 55 together. For instance, the support may be formed by a printed circuit board (PCB).

The control and processing unit 55 has the function of controlling the light source 21 in a continuous or pulsed way and of receiving and amplifying the voltage signal outputted by the photodetector 22. Moreover, the control and processing unit 55 outputs a control signal 51, which, according to the application of the detector device 60, can directly drive turning-on and turning-off and adjusting of an external device or apparatus, such as a conditioning system.

Figure 8:
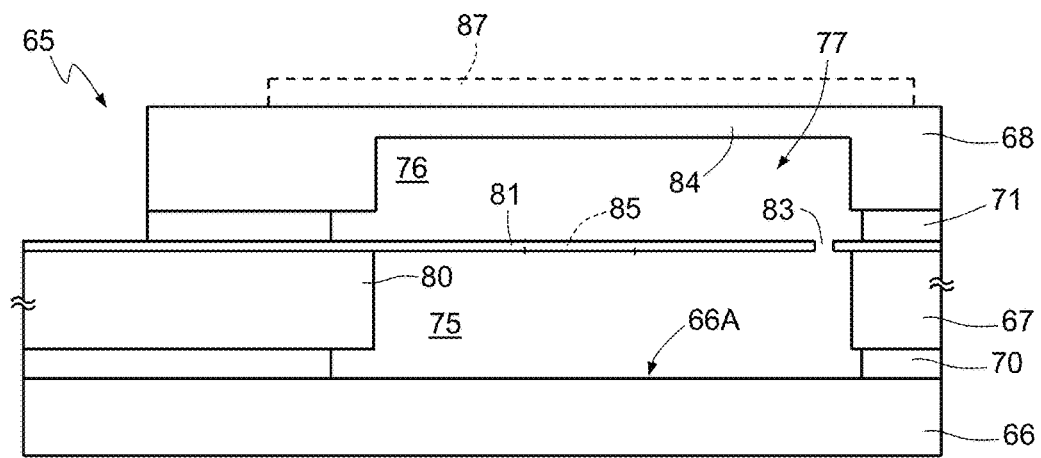
FIG. 8 is a cross-section of a component of the detector device of FIG. 5.

The light source 21 and the photodetector 22 may be manufactured in a similar way, as illustrated in FIG. 8, where they both appear as optical component 65.

In detail, the optical component 65 is formed by a structural region 66, an active region 67, and a cap region 68, overlapped on each other and bonded together. For instance, the regions 66-68 are formed from three wafers of semiconductor material, such as silicon, bonded together via a first 70 and a second bonding layer 71, for example of glass frit, and cut to form the optical component 65.

The structural region 66, which, in the considered example, is of non-treated monocrystalline silicon, may have a desired thickness and have a top surface 66A treated so as to reflect the wavelengths considered.

The active region 67 forms the active structure, having a thickness of, for example, 200 to 300 µm, and includes a monolithic body 80 of monocrystalline silicon and a membrane layer 81, of dielectric material. The monolithic body 80 has a through membrane opening 75, for example cylindrical or parallelepipedal, with a diameter or side of, for example, 1-1.5 mm. The membrane layer 81 houses or carries an active structure, designated as a whole by 85 and typical to the formed optical component.

For instance, if the optical component 65 is the light source 21, the active structure may be formed by a resistor of conductive material, for example polycrystalline silicon, tungsten, or platinum, immersed in the dielectric matrix of the membrane layer 81, intended to emit infrared light radiation by the Joule effect when a current is applied and as a function of the temperature reached by the resistor.

If the optical component 65 is the photodetector 22 made as a bolometer, the active structure may contain a conductive material that changes its resistance as a function of the operating temperature. In this case, an incident infrared radiation causes a temperature rise that can be detected. This element has a suitable biasing (see, for example, "Infrared Detectors" by Antony Rogalski, CRC Press, 2011). If the optical component 65 is the photodetector 22 made as a thermopile, the active structure 85 may be formed by thermocouples carried by, or formed in, the membrane layer 81 and including N+ polysilicon, P+ polysilicon, and aluminum layers, series-connected (see, for example, "OMRON Develops the World's First* 16×16 Element MEMS Non-contact Thermal Sensor for Use in Human Presence Sensors Utilising Wafer-level Vacuum Packaging Technology", https://www.omron.com/media/press/2013/05/e0529.html).

The cap region 68 is of monocrystalline silicon worked to form a cap cavity 76, for example of a cylindrical or parallelepipedal shape, with a diameter or side equal to those of the membrane opening 75 and a depth of, for example, 100 μm. The cap cavity 76 is vertically aligned to the membrane opening 75 to form an inner chamber 77 therewith, so that the membrane layer 81 is suspended between them.

Also the bonding layers 70, 71 are perforated at the membrane opening 75 and the cap cavity 76 and may have a thickness of 30 μm. In particular, the thickness of the gluing layer 71 and of the cap cavity 76 is approximately 130 μm.

The membrane layer 81 has a hole 83 connecting the membrane opening 75 and the cap cavity 76 together and keeps them at a same pressure, which is extremely low (less than 1 mbar, "vacuum" condition).

The cap cavity 76 delimits underneath a thin portion 84 of the cap region 68. The thin portion 84 may be coated both inside and outside by an anti-reflection layer (not shown). For instance, the anti-reflection layer may be a dielectric material (for example, $SiO_2$, $Si_3N_4$, ZnS) with an optical thickness nd=$\lambda$/4, where $\lambda$ is the wavelength chosen for optimal operation of the detector device 40. In the case considered, $CO_2$-detection, $\lambda$=4.23 μm.

The thin portion 84 has a thickness such as to pass light radiation (emitted light radiation EL when the optical component forms the light source 21 and reflected light radiation RL when the optical component forms the photodetector 22), beside ensuring a sufficient mechanical stability of the optical component 65. In particular, the thickness of the thin portion 84 is such as to pass 50% of the light, in absence of the anti-reflection layers; instead, in presence of the anti-reflection layers, the transmission of light may reach 99% at the wavelength of interest. For instance, the thickness of the thin portion 84 may be 50 μm to 300 μm.

Pads or bumps (not shown and electrically connected to the active structure 85), may be provided on the top part of the active region 67 not covered by the cap region 68 or underneath the structural region 66 and be connected in a known manner, not shown, to the electrical-connection lines 54 (FIG. 5).

Figure 9:
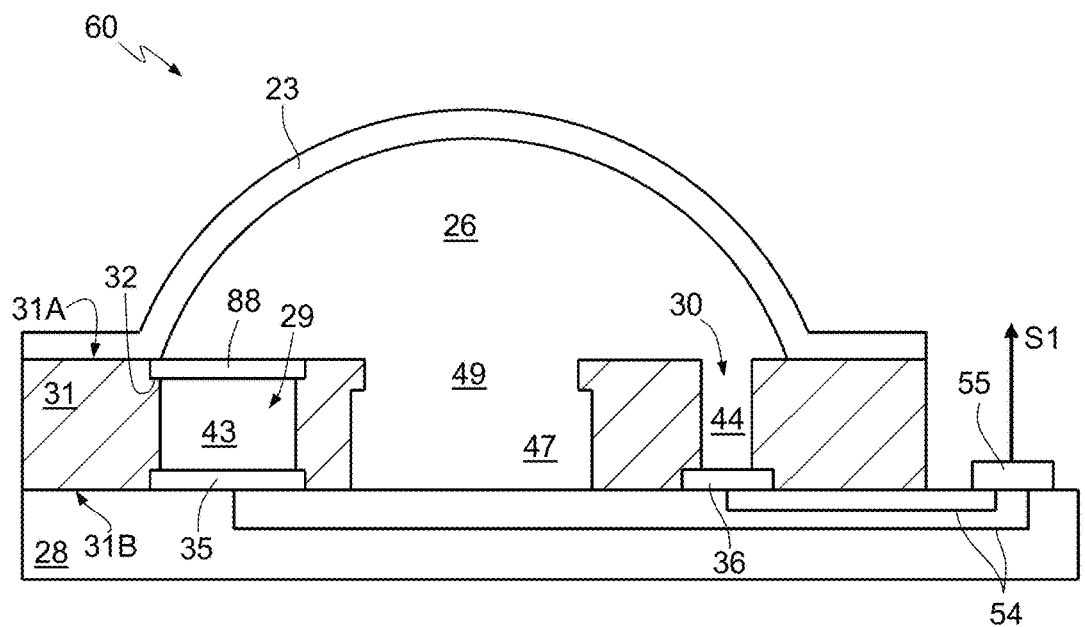
FIGS. 9 and 10 show different embodiments of the detector device of FIG. 2.

According to an embodiment of the present detector device, illustrated in FIG. 9, the emission and reception filters 24, 25 may be integrated in the optical component 65. For instance, with reference to FIG. 8, an integrated filter 87 may be arranged above the thin portion 84 of the cap region 68, for example formed by dielectric and/or metal layers (not shown), in a per se known manner. For instance, the emission and reception filters 24, 25, when forming plasmonic filters, may be manufactured as described in "A monolithically integrated plasmonic infrared quantum dot camera" Sang Jun Lee, et al., Nature communications, DOI: 10.1038/ncomms1283, 2011, www.nature.com/naturecommunications. In this case, the structure of the casing 37 (illustrated in FIG. 9), is altogether similar to that of FIG. 5, except for the absence of the reception-filter cavity 33.

Moreover, in this case, a focusing lens 88 may be arranged in the emission-filter cavity 32; alternatively, the emission-filter cavity 32 may be missing.

Figure 10:
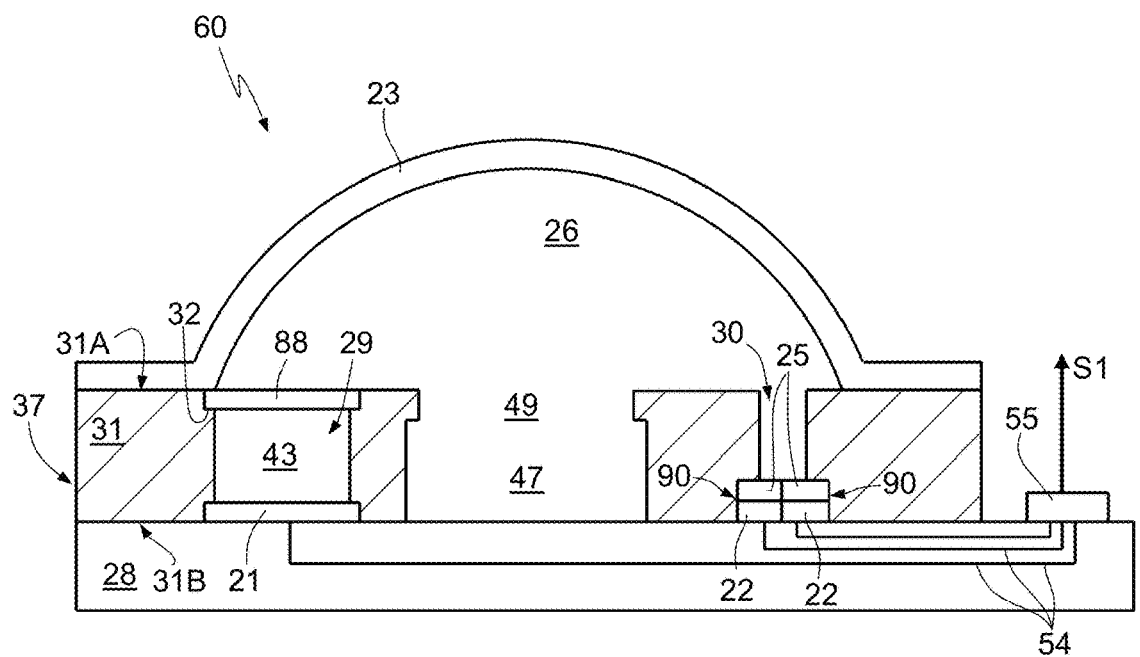

According to another embodiment (illustrated in FIG. 10), the light-receiving element 36 may be formed by an array of photodetectors 22 (two in FIG. 9), each having an own reception filter 25. The reception filters 25 may have own transmission/absorption characteristics, different from each other. For instance, the light-receiving element 36 may be formed by a plurality of optical components 65 of the type illustrated in FIG. 8, each having an own active structure 85 and an own integrated filter 87. In this case, the detector device 20 is of a multi-channel type, and each channel may be configured to detect a respective gas molecule, characterized by an own absorption spectrum.

The detector device 20 described herein has numerous advantages.

In particular, it has a simple and inexpensive structure by virtue of a spacer body housing the light-emitting element 35 and the light-receiving element 36 and comprising a reception opening 30, the dimensions whereof may be designed to select the light radiation useful for determining the concentration of the molecules to be detected. Thereby, it is possible to use a low-cost micromachined photodetector. Moreover, also the arrangement of the light-emitting element 35 in an own emission opening 29 defined by walls blocking the generated non-useful (wide angle) light radiation, enables use of a low-cost light source with a wide emission spectrum, which does not require costly focusing lenses. The light-emitting element 35 and the light-receiving element 36 may moreover be arranged easily co-planar and, due to the use of not perfectly focused light radiation, do not require high precision alignment with respect to the foci F1 and F2.

In addition, the selection of the rays incident upon the photodetector as a result of the reception and emission openings enables use of a wide light source, where many beams are slightly out of focus. In this way, the reflected light radiation reaching the photodetector does not comprise only single-reflection beams, arriving directly from focus of the source, but also beams slightly out of focus that, with two or more reflections, arrive at an angle of less than 20° with respect to the vertical (optical axis of the photodetector).

Forming a mirror with a curved, in particular partially ellipsoidal, shape allows the reflecting surface to be easy to treat and have high efficiency and reduced losses, besides providing an optical path sufficient for the emitted light radiation that passes the gas to be analyzed. Moreover, the light radiation detected by the photodetector is sufficiently focused, and thus it is not necessary to provide additional lenses that would increase the size and costs of the detector device.

The structure of the detector device comprising moldable pieces that define housings for the components is simple and may be manufactured at a low cost.

The possibility of using a plasmonic filter as reception filter 25 is advantageous as regards manufacturing costs and simplicity.

The selectivity of the device does not depend upon the alignment precision of the components and allows the use of low-cost components. In particular, the light source and the photodetector can be manufactured using MEMS (Micro-Electro-Mechanical System) manufacturing techniques with the package formed by regions obtained from wafers bonded together and enclosing the active structures. Thus, they may be manufactured in a simple, inexpensive, and reliable way, and have electrical and optical characteristics that are stable over time and in variable working conditions. The use of components that may be manufactured using MEMS technologies and the possibility of obtaining an optical path of sufficient length, by virtue of the double reflection of the useful light radiation, allows the present detector device to have small dimensions. In particular, the present applicant has shown that it is possible to manufacture a detector device of very small dimensions, with a width, i.e., parallel to the axis X (FIG. 7A), of less than 2.7 cm, a depth, i.e., parallel to the axis Y, of less than 2.1 cm, and a height, i.e., parallel to the axis Z, excluding the support 28, of approximately 0.8 cm. Moreover, with a spacer body 31 of a height h=0.35 cm it is possible to form the dome portion 40 so that the ellipse I has a major axis D1=1.6 cm and a minor axis D2=1.06 cm.

The described detector device enables simple inlet of gas from outside through the groove 47 and the passage holes 49 without, however, allowing inlet of light from outside, due to the tortuous conformation of the gas channel 27 and of the walls thereof (shaped so as to absorb the radiation), which enables diffusion of the gas to be analyzed but does not allow passage of the light radiation.

The present detector device has low consumption levels since it is possible to use a low-power light source, operating in vacuum conditions.

Finally, it is clear that modifications and variations may be made to the detector device described and illustrated herein, without thereby departing from the scope of the present disclosure. For instance, even though the foregoing description makes specific reference to the detection $CO_2$ molecules, the described detector device may be used for detecting other molecules, such as CO, methanol, and hydrocarbons.

The type of emission filter and of reception filter may vary; for example, in addition to the plasmonic filters and interferential filters referred to, also sapphire filters or KBr filters may be used.

The photodetector 22 may be different from what has been described with reference to FIG. 8; for example, a photodetector may be used formed by semiconductors of Groups III-V.

The optical component and/or the light source may comprise a micromachined lens transparent to radiation in the wavelength range of interest and positioned so that the optical emission and/or reception area is included in the solid angle subtended by the lens.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An NDIR detector device for detecting molecules in a gas, comprising:
   a casing including a support, a spacer body, and a mirror element fixed together, the support having a bearing surface and the mirror element having a reflecting surface;
   a light-emitting element arranged on the bearing surface and facing the reflecting surface, the light-emitting element being configured to direct infrared radiation toward the reflecting surface; and
   a light-receiving element arranged on the bearing surface and facing the reflecting surface, the light-receiving element being configured to receive light radiation reflected by the reflecting surface,
   wherein the spacer body has an emission opening housing the light-emitting element and a reception opening housing the light-receiving element, and
   wherein the reception opening comprises a radiation-limitation portion configured to prevent entry of reflected light radiation having an angle, with respect to a normal to the bearing surface, of greater than a preset value.

2. The device according to claim 1, wherein the reflecting surface has a curved shape.

3. The device according to claim 1, wherein the reflecting surface has a shape of a surface portion of an ellipsoid having a first focus and a second focus and wherein the light-emitting element and the light-receiving element are arranged at the first focus and at the second focus, respectively.

4. The device according to claim 1, wherein the light-receiving element comprises a photodetector and a reception filter.

5. The device according to claim 4, wherein the photodetector is a photodetector element chosen in the group consisting of a thermopile, a bolometer, and a pyrometer, and the reception filter is a filter element chosen in the group consisting an interferential filter, a plasmonic filter, a sapphire filter, and a KBr filter.

6. The device according to claim 5, wherein the photodetector comprises a plurality of photodetector elements arranged side-by-side and the reception filter comprises a plurality of filter elements, the filter elements having different absorption/transmission bands and being respectively arranged above photodetector elements.

7. The device according to claim 1, wherein at least one of the light-emitting element and the light-receiving element is formed by an optical component comprising a structural region, an active region, and a cap region, of semiconductor material, overlying each other and bonded together, the structural region, the active region, and the cap region defining an inner chamber housing an active structure.

8. The device according to claim 7, wherein the cap region has a thin portion transparent to light.

9. The device according to claim 8, wherein the optical component comprises an integrated filter formed above the thin portion of the cap region.

10. The device according to claim 8, wherein the optical component comprises an integrated lens formed above the thin portion of the cap region.

11. The device according to claim 1, wherein the emission opening is defined by blackened walls.

12. The device according to claim 1, wherein:
   the mirror element and the spacer body are formed by molded plastic pieces bonded together;
   the mirror element includes a dome portion defining the reflecting surface and delimiting, with the spacer body, a reflection chamber; and
   the spacer body has a parallelepipedal shape forming the emission opening, the reception opening, and a gas-inlet channel fluidically connecting the external environment to the reflection chamber.

13. The device according to claim 12, wherein the gas-inlet channel comprises a groove extending between two opposite walls of the spacer body, and at least one slit extending between the groove and the reflection chamber.

14. The device according to claim 12, wherein the emission opening comprises an emission through hole and a source cavity aligned to the emission through hole, facing the support and housing a light source of the light-emitting element, and the reception opening comprises a reception through hole and a photodetector cavity aligned to the reception through hole and facing the support.

15. The device according to claim 14, wherein the spacer body further comprises a first filter cavity aligned to the emission through hole and facing the dome portion.

16. The device according to claim 15, wherein the spacer body further comprises a second filter cavity aligned to the reception hole and facing the dome portion.

17. The device according to claim 12, wherein the support comprises a printed-circuit board, the device further comprising:
- a control unit carried by the printed-circuit board; and
- electrical connections housed by the printed-circuit board and electrically coupling the control unit to the light-emitting element and to the light-receiving element.

18. A detector device for detecting molecules in a gas, comprising:
- a casing including a support, a spacer body, and a mirror element fixed together, the support having a bearing surface and the mirror element having a reflecting surface;
- a light-emitting element arranged on the bearing surface and facing the reflecting surface, the light-emitting element being configured to direct infrared radiation toward the reflecting surface; and
- a light-receiving element arranged on the bearing surface and facing the reflecting surface, the light-receiving element being configured to receive light radiation reflected by the reflecting surface, wherein:
  the spacer body has an emission opening housing the light-emitting element and a reception opening housing the light-receiving element;
  the spacer body includes reception wall portions extending upwardly from the light-receiving element toward the mirror element and defining the reception opening.

19. The device according to claim 18, wherein the emission opening comprises an emission through hole and a source cavity aligned to the emission through hole, facing the support and housing a light source of the light-emitting element, and the reception opening comprises a reception through hole and a photodetector cavity aligned to the reception through hole and facing the support.

20. The device according to claim 19, wherein the spacer body further comprises a first filter cavity aligned to the emission through hole and facing the dome portion, and a second filter cavity aligned to the reception hole and facing the dome portion.

21. A detector device for detecting molecules in a gas, comprising:
- a support having a bearing surface;
- a mirror element having a dome portion defining a reflecting surface;
- a light-emitting element arranged on the bearing surface and facing the reflecting surface, the light-emitting element being configured to direct infrared radiation toward the reflecting surface;
- a light-receiving element arranged on the bearing surface and facing the reflecting surface, the light-receiving element being configured to receive light radiation reflected by the reflecting surface; and
- a spacer body positioned between the support and the mirror element and delimiting, with the dome portion, a reflection chamber, wherein the spacer body includes:
  an emission opening housing the light-emitting element;
  a reception opening housing the light-receiving element;
  reception wall portions extending upwardly from the light-receiving element toward the mirror element and defining the reception opening; and
  a gas-inlet channel fluidically connecting an external environment to the reflection chamber.

22. The device according to claim 21, wherein the gas-inlet channel comprises a groove extending between two opposite walls of the spacer body, and at least one slit extending between the groove and the reflection chamber.

23. The device according to claim 21, wherein the emission opening comprises an emission through hole and a source cavity aligned to the emission through hole, facing the support and housing a light source of the light-emitting element, and the reception opening comprises a reception through hole and a photodetector cavity aligned to the reception through hole and facing the support.

\* \* \* \* \*